US012164325B2

(12) United States Patent
Nakase et al.

(10) Patent No.: US 12,164,325 B2
(45) Date of Patent: Dec. 10, 2024

(54) MULTIDIRECTIONAL INPUT DEVICE AND CONTROLLER

(71) Applicant: SHENZHEN ZESUM TECHNOLOGY CO., LTD., Shenzhen (CN)

(72) Inventors: Yusho Nakase, Shenzhen (CN); Xianwu Hu, Shenzhen (CN); Shiying Yang, Shenzhen (CN); Chaoxian Chen, Shenzhen (CN)

(73) Assignee: SHENZHEN ZESUM TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/347,748

(22) Filed: Jul. 6, 2023

(65) Prior Publication Data

US 2024/0160240 A1 May 16, 2024

(30) Foreign Application Priority Data

Nov. 14, 2022 (CN) ......................... 202211422754.7

(51) Int. Cl.
*G05G 9/047* (2006.01)
*G05G 5/05* (2006.01)

(52) U.S. Cl.
CPC ............... *G05G 9/047* (2013.01); *G05G 5/05* (2013.01); *G05G 2505/00* (2013.01)

(58) Field of Classification Search
CPC ................................. G05G 9/047; G05G 5/05
See application file for complete search history.

(56) References Cited

U.S. PATENT DOCUMENTS 5,043,709 A * 8/1991 Kim ....................... G05G 9/047 345/161
6,078,247 A * 6/2000 Shimomura ........... H01C 10/16 338/160

(Continued)

FOREIGN PATENT DOCUMENTS

CN 105161345 A 12/2015
CN 112490053 A 3/2021

(Continued)

OTHER PUBLICATIONS

Notice of Reasons for Refusal issued in counterpart Japanese Patent Application No. JP 2023-018240, dated Apr. 23, 2024.

(Continued)

*Primary Examiner* — Jake Cook
(74) *Attorney, Agent, or Firm* — Westbridge IP LLC

(57) ABSTRACT

A multidirectional input device includes a housing, an operating body, a rocker arm member, a reset member, and a first pressing part. A chamber is provided inside the housing which forms an opening communicating with the chamber. The operating body is provided in the chamber and extends out of the chamber from the opening. The rocker arm member and the reset member are provided in the chamber and are drivingly connected. The reset member and the operating body are elastically connected. The first pressing part is provided on the rocker arm member and extends in a direction close the reset member. During a movement process of operating body, the lower end face of operating part abuts against the upper end face of reset member, and the first pressing part abuts against an edge of the upper end face of reset member.

6 Claims, 7 Drawing Sheets

(56) References Cited

U.S. PATENT DOCUMENTS

| | | | | |
|---|---|---|---|---|
| 6,353,430 | B2 * | 3/2002 | Cheng | G05G 9/047 345/161 |
| 6,654,005 | B2 * | 11/2003 | Wang | G05G 9/04796 345/161 |
| 6,670,945 | B1 * | 12/2003 | Nakamura | G05G 9/047 345/161 |
| 6,989,497 | B1 * | 1/2006 | Lee | G05G 9/047 200/6 A |
| 10,770,247 | B1 * | 9/2020 | Wu | H01H 23/04 |
| 2002/0005833 | A1 * | 1/2002 | Furukawa | G05G 9/047 345/161 |
| 2022/0155810 | A1 * | 5/2022 | Nakase | G05G 9/047 |
| 2022/0155811 | A1 * | 5/2022 | Nakase | G05G 9/047 |

FOREIGN PATENT DOCUMENTS

| | | | |
|---|---|---|---|
| JP | 2001110278 | A | 4/2001 |
| JP | 2009009798 | A | 1/2009 |
| JP | 2021077547 | A | 5/2021 |
| JP | 2021158096 | A | 10/2021 |
| TW | I223299 | B | 11/2004 |
| TW | 200947489 | A | 11/2009 |

OTHER PUBLICATIONS

Office Action issued in counterpart Taiwanese Patent Application No. 112108571, dated Mar. 29, 2024.

* cited by examiner

MULTIDIRECTIONAL INPUT DEVICE AND CONTROLLER

CROSS-REFERENCE TO RELATED APPLICATIONS

This application claims priority to Chinese Patent Application No. 202211422754.7, filed on Nov. 14, 2022, the entire contents of which are incorporated herein by reference.

TECHNICAL FIELD

The present application relates to the technical field of control devices, in particular to a multidirectional input device and a controller.

BACKGROUND

Nowadays, electronic devices such as gamepads, unmanned aerial vehicles (UAV), and virtual reality (VR) are widely equipped with multidirectional input devices, and command control is realized by rotating the multidirectional input devices. The existing multidirectional input device generally includes a housing fixed to a plate, two rocker arms arranged in an up-and-down direction, an operating body, and an elastic member. The two rocker arms are driven to rotate by rotating the operating body. However, during the rotation of the operating body, the energy of the elastic member is stored by unsymmetrically pressing the elastic member, so as to realize the automatic reset of the operating body when the external force is unloaded.

In the existing solution, the elastic member generally abuts against the bottom of two rocker arms when the elastic member is in a reset state. When rotating the operating body, the elastic member is unsymmetrically pressed by the rocker arm, the elastic member abuts against an end of the rocker arm as a pivot. With the rotation of the operating body, the elastic member will abut against each rocker arm circularly, and during the switching process of the abutting position, the elastic member will throb due to the different positions of each of the rocker arms, and the throbbing is transmitted to the operating body, thereby affecting user's hand feeling.

SUMMARY

The main purpose of the present application is to provide a multidirectional input device, aiming to solve the technical problem that in the related art, the elastic member will throb and thereby affects the operating feeling when the operating body in the multidirectional input device rotates.

In order to achieve the purpose above, the present application provides a multidirectional input device, including: a housing, an operating body, a rocker arm member, a reset member, and a first pressing part.

A chamber is provided inside the housing, and the housing is provided with an opening communicating with the chamber.

The operating body is rotatably mounted in the chamber for an inclination operation, an end of the operating body extends out of the chamber from the opening, an operating part is provided at a lower end of the operating body, and a lower end face of the operating part is circular.

The rocker arm member is provided in the chamber, the operating body is drivingly connected to the rocker arm member, to make the rocker arm member rotate following the inclination operation of the operating body.

The reset member is provided in the chamber, and is elastically connected to the operating body. An upper end face of the reset member towards the opening abuts against the lower end face of the operating part to support the reset member.

The first pressing part is provided on the rocker arm member and extends in a direction close to the reset member.

During a movement process of the operating body, the lower end face of the operating part abuts against the upper end face of the reset member, and the first pressing part abuts against an edge of the upper end face of the reset member.

In an embodiment, a lower surface of the first pressing part is an arc-shaped surface or a plane surface, and the lower surface extends along a circumference of the upper end face of the reset member.

In an embodiment, the multidirectional input device further includes a second pressing part, the second pressing part is provided on a side wall of the chamber and extends in a direction close to the reset member. During the movement process of the operating body, at least one of the first pressing part and the second pressing part abuts against a side surface of the reset member that faces towards the opening.

In an embodiment, the rocker arm member includes an upper rocker arm and a lower rocker arm which is orthogonal to the upper rocker arm, the second pressing part is provided at two opposite ends of the upper rocker arm and two opposite ends of the lower rocker arm, and the first pressing part is provided between two neighboring second pressing parts.

In an embodiment, an arc transition is formed between a bottom surface of the operating part and a peripheral surface of the operating part.

In an embodiment, the reset member includes a spring and a pressing plate. The spring is provided in the chamber and extending in a direction close to the opening. The pressing plate is provided at an end of the spring towards the opening. The spring is configured to press the pressing plate against the operating body. During the movement process of the operating body, the first pressing part abuts against a side of the pressing plate towards the opening.

In an embodiment, a rib is provided at a lower end face of the pressing plate, and the rib is provided along a circumference of the lower end face of the pressing plate to restrict the spring to an inner side of the rib.

In an embodiment, the spring is a conical spring, and an outer diameter of the spring increases gradually from a bottom wall of the chamber to the pressing plate.

A controller is further provided in the present application, the controller includes the multidirectional input device which is mentioned above.

In technical solutions of the present application, the multidirectional input device includes a housing, an operating body, a rocker arm member, a reset member and a first pressing part. A chamber is provided inside the housing, and the housing is provided with an opening communicating with the chamber. The operating body is rotatably mounted in the chamber for an inclination operation, an end of the operating body extends out of the chamber from the opening, an operating part is provided at a lower end of the operating body, and a lower end face of the operating part is circular. The rocker arm member is provided in the chamber and can rotate in the chamber, the operating body is drivingly connected to the rocker arm member. The inclination operation of the operating body can drive the rotation of the rocker arm member. By connecting the rocker arm member with devices such as potentiometers, the position of the rocker arm can be detected, and the signal can be input by tilting the operating body. The reset member is also provided in the chamber, and is elastically connected to the operating body. When at an initial position, an upper end face of the reset member towards the opening abuts against the lower end face of the operating part. When the operating body inclines, the operating part can apply an elastic force to the reset member to store energy. When the external force is unloaded, the reset member can propel the operating part to move, realizing the reset movement of the operating body. The first pressing part is provided at the rocker arm member, and extends towards the reset member. Thus, when the operating body inclines, the reset member deflects, the edge of the operating part abuts against the upper end face of the reset member, and the edge of the upper end face of the reset member will abut against the first pressing part as a support. Since the lower end face of the operating part is circular, the edge of the lower end face will always touch the reset member during the rotation of the operating part, and the edge of the upper end face of the reset member is always supported by the first pressing part, in other words, the reset member is always in contact with the operating body and the first pressing part during the movement of the reset member, thereby preventing the throbbing, improving the operating feeling of the multidirectional input device.

BRIEF DESCRIPTION OF THE DRAWINGS

In order to more clearly illustrate the technical solutions in the embodiments of the present application or in the prior art, drawings that are needed to illustrate the embodiments and the prior art are simply introduced below. Obviously, drawings introduced below are just some of the embodiments in the present application. For those of ordinary skill in the art, other figures may be further obtained without creative efforts according to the structures shown in drawings below.

Figure 1:
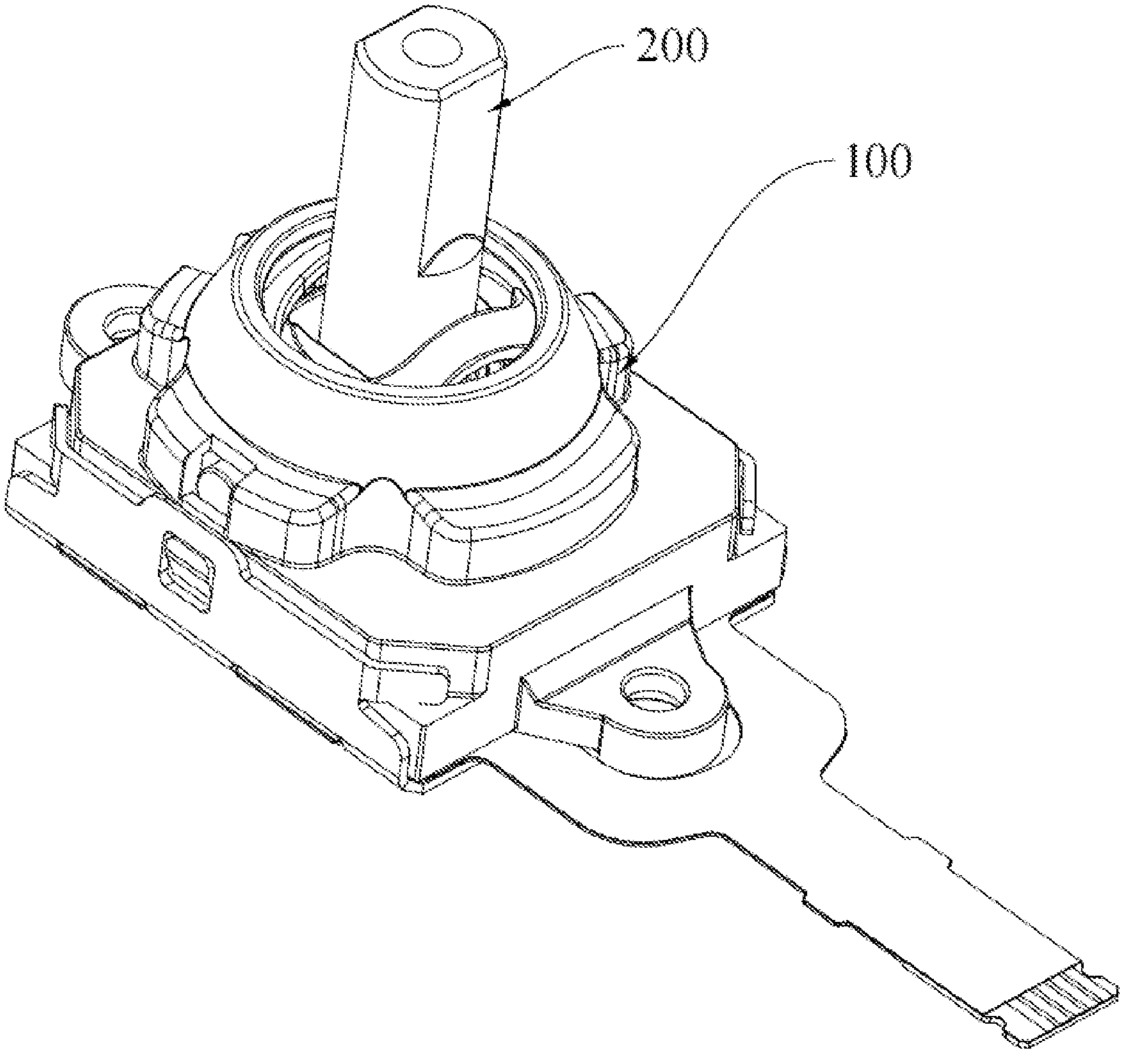
FIG. 1 is a schematic structural view of a multidirectional input device according to an embodiment of the present application.

The realization of the purpose, the functional feature, and the advantage of present application will be further illustrated referring to the drawings.

DETAILED DESCRIPTION OF THE EMBODIMENTS

The technical solutions of the embodiments of the present application will be described in more detail below with reference to the accompanying drawings. It is obvious that the embodiments to be described are only some rather than all the embodiments of the present application. All other embodiments obtained by persons skilled in the art based on the embodiments of the present application without creative efforts shall fall within the scope of the present application.

It should be noted that all the directional indications (such as up, down, left, right, front, rear, etc.) in the embodiments of the present application are only used to explain the relative positional relationship, movement, or the like of the components in a certain posture (as shown in the drawings). If the specific posture changes, the directional indication will change accordingly.

In the present application, unless otherwise specifically specified and limited, the terms "connected", "fixed", etc. should be understood in a broad sense, for example, "fixed" can be a fixed connection, a detachable connection, or be integrated as a whole; "connected" can be a mechanical connection or an electrical connection; can be directly connected, or indirectly connected through an intermediate medium, or can be the internal communication between two elements or the interaction relationship between two elements. For those of ordinary skilled in the art, the specific meaning of the above-mentioned terms in the present application can be understood according to specific situations.

Besides, the descriptions associated with, e.g., "first" and "second," in the present application are merely for descriptive purposes, and cannot be understood as indicating or suggesting relative importance or impliedly indicating the number of the indicated technical feature. Therefore, the feature associated with "first" or "second" can expressly or impliedly include at least one such feature. The meaning of "and/or" appearing in the disclosure includes three parallel scenarios. For example, "A and/or B" includes only A, or only B, or both A and B. In addition, the technical solutions of the various embodiments can be combined with each other, but the combinations must be based on the realization of those skilled in the art. When the combination of technical solutions is contradictory or cannot be achieved, it should be considered that such a combination of technical solutions does not exist, nor does it fall within the scope of the present application.

The multidirectional input device is widely applied in the field of VR devices, UAV controlling, etc. The multidirectional input device generally includes a housing, a rocker arm, a stick, an elastic member, and other members. The rocker arm is driven to rotate by the rotation of the stick, to realize the output of rotation. An unsymmetrical pressure is loaded on the elastic member and the energy is stored when the stick rotates, the elastic member suffers an unsymmetrical pressure and deflects, and the end part of the side that suffers the unsymmetrical pressure abuts against the rocker arm as a support point. During the rotation of the stick, the support point switches among each of the rocker arms. Since there are large gaps between rocker arms, the elastic member will throb during the deflection process, and transmit the throbbing to the stick, affecting the operating feeling.

To solve the above problem, the present application provides a multidirectional input device, including: a housing 100, an operating body 200, a rocker arm member 300, a reset member 400, and a first pressing part 500.

A chamber is provided inside the housing 100, and the housing 100 is provided with an opening communicating with the chamber.

The operating body 200 is rotatably mounted in the chamber for an inclination operation, an end of the operating body 200 extends out of chamber from the opening, an operating part 700 is provided at a lower end of the operating body 200, and a lower end face of the operating part 700 is circular.

The rocker arm member 300 is provided in the chamber, the operating body 200 is drivingly connected to the rocker arm member 300, to make the rocker arm member 300 rotate following the inclination operation of the operating body 200.

The reset member 400 is provided in the chamber, the reset member 400 is elastically connected to the operating body 200, and an upper end face of the reset member 400 that faces towards the opening abuts against the lower end face of the operating part 700 to support the reset member 200.

The first pressing part 500 is provided on the rocker arm member 300 and extending in a direction close to the reset member 400.

During a movement process of the operating body 200, an edge of the lower end face of the operating part 700 abuts against the upper end face of reset member 400, the first pressing part 500 abuts against an edge of the upper end face of the reset member 400.

In technical solutions of the present application, the multidirectional input device includes a housing 100, an operating body 200, a rocker arm member 300, a reset member 400 and a first pressing part 500. A chamber is provided inside the housing 100, and the housing 100 is provided with an opening communicating with the chamber. The operating body 200 is rotatably mounted in the chamber for an inclination operation, an end of the operating body 200 extends out of the chamber from the opening, an operating part 700 is provided at a lower end of the operating body 200, and a lower end face of the operating part 700 is circular. The rocker arm member 300 is provided in the chamber and can rotate in the chamber, the operating body 200 is drivingly connected to the rocker arm member 300. The inclination operation of the operating body 200 can drive the rotation of the rocker arm member 300. By connecting the rocker arm member 300 with devices such as potentiometers, the position of the rocker arm can be detected, and the signal can be input by tilting the operating body 200. The reset member 400 is also provided in the chamber, and is elastically connected to the operating body 200. When at an initial position, an upper end face of the reset member 400 that faces towards the opening abuts against the lower end face of the operating part 700. When the operating body 200 inclines, the operating part 700 can apply an elastic force to the reset member 400 to store energy. When the external force is unloaded, the reset member 400 can propel the operating part 700 to move, realizing the reset movement of the operating body 200. The first pressing part 500 is provided at the rocker arm member 300, and extends towards the reset member 400. Thus, when the operating body 200 inclines, the reset member 400 deflects, the edge of the operating part 700 abuts against the upper end face of the reset member 400, and the edge of the upper end face of the reset member 400 will abut against the first pressing part 500 as a support. Since the lower end face of the operating part 700 is circular, the edge of the lower end face will always touch the reset member 400 during the rotation of the operating part 700, and the edge of the upper end face of the reset member 400 is always supported by the first pressing part 500, in other words, the reset member 400 is always in contact with the operating body 200 and the first pressing part 500 during the movement of the reset member 400, thereby preventing the throbbing, improving the operating feeling of the multidirectional input device.

Figure 2:
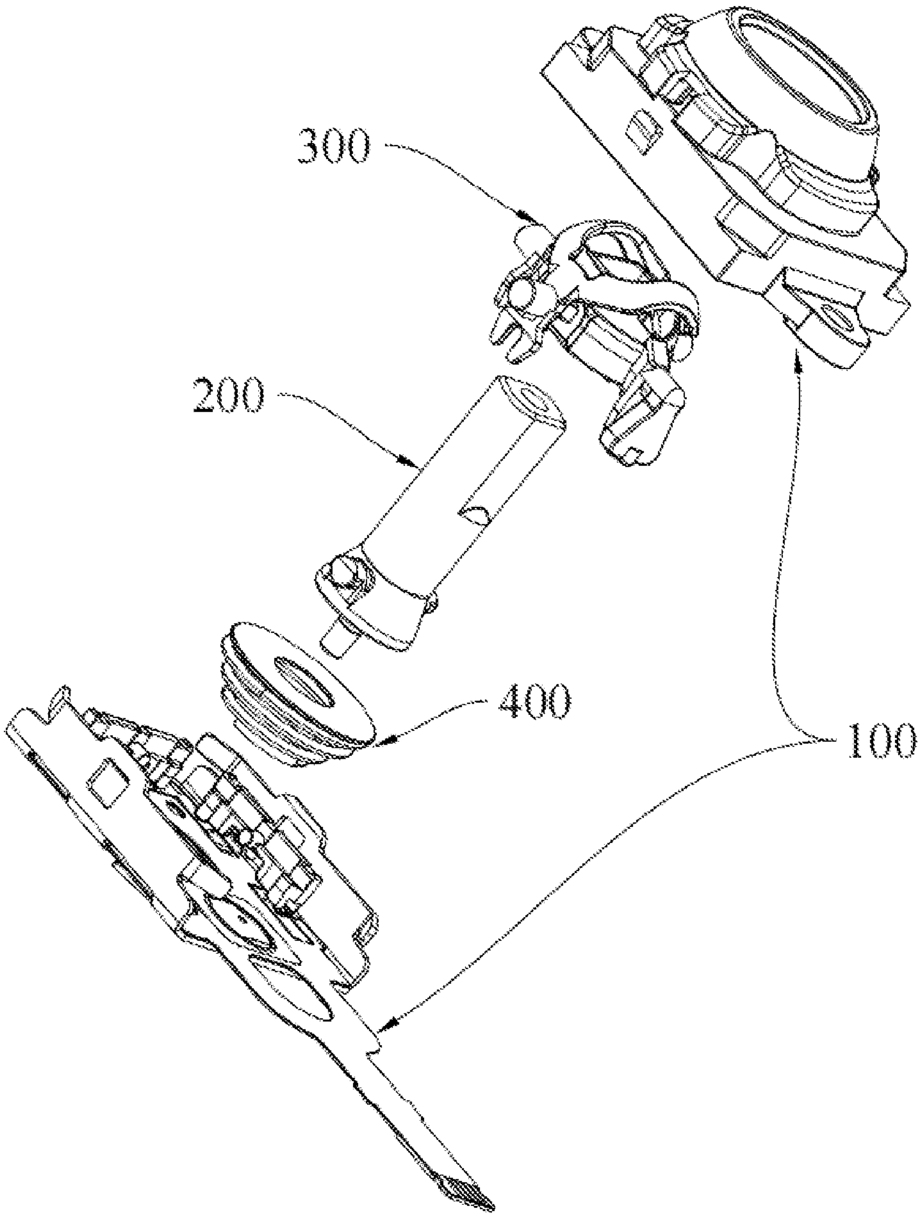
FIG. 2 is a structural exploded schematic view of a multidirectional input device according to an embodiment of the present application.

Specifically, as shown in FIG. 1 to FIG. 5, in order to realize a multidirectional input function, the multidirectional input device mainly includes a housing 100, an operating body 200, a rocker arm member 300, and a reset member 400. The housing 100 is a component that have a chamber inside, and the housing 100 is provided with an opening. In order to facilitate the manufacture, as shown in FIG. 2, the housing 100 could be separated into an upper housing and a lower housing. The upper housing has a top wall and a side wall disposed around the top wall, the top wall is provided with an opening, the top wall and the side wall enclose and form a chamber to contain other functional components. The lower part of the upper housing is open to facilitate the installation of other functional components. The lower housing is a platelike structure, the lower housing could be buckled to the position of the opening below the upper housing to enclose the chamber. Besides, in practical use, the lower housing can be used as a support for other components. Moreover, an operating body 200 is provided inside the housing 100. The operating body 200 may be a sticklike structure, the operating body 200 is rotatably accommodated in the chamber, and an end of the operating body 200 passes through the opening of the housing 100. Besides, an operating part 700 may be disposed on the lower end face of the operating body 200. The operating part 700 may be a cylinder or a frustum of a cone structure, the lower end face of the operating part 700 is a circular plane. A rocker arm member 300 is further provided inside the housing 100. The rocker arm member 300 is rotatably connected to the housing 100, the rocker arm member 300 may be drivingly connected to the operating body 200 by a transmission structure. The rotation of the rocker arm member 300 is driven by the swing of the operating body 200. A rotational potentiometer can be mounted to a rotating shaft of the rocker arm member 300. The movement of the operating body 200 drives the rocker arm member 300 to rotate, and then drives the rotational potentiometer to rotate, thereby triggering a signal change of a position sensor, and realizing the function of signal input. In this embodiment, two ends of the rocker arm member 300 extend downward to have a driving part, a contact plate spring is rotatably connected to the driving part, and a lower end of the contact plate spring abuts against a metal contact point which is provided on a bottom wall of the chamber. When the operating body 200 drives the rocker arm member 300 to rotate, the rocker arm member 300 drives the contact plate spring to slide on the metal contact point by the driving part. By measuring the potential difference between the metal contact point and the contact plate spring, the position determination of the contact plate spring can be realized, and then the binding of the position of operating body 200 and the potential signal is realized. Moreover, in order to support the operating body 200, a reset member 400 is further provided to the multidirectional input device. The reset member 400 is disposed in the chamber. The reset member 400 may be spring 420 or other elastic members. The reset member 400 may be disposed on the bottom wall of the chamber of the housing 100. The upper end face of the reset member 400 towards the opening abuts against the lower end face of the operating part 700. Thereby, when the operating body 200 is in a balanced position, that is, a middle position, the contact between the operating part 700 and the reset member 400 is a surface contact. When the operating body 200 inclines, the operating part 700 inclines, the edge of the lower end face of the operating part 700 abuts against the reset member 400. As the edge of the lower end face of the operating part 700 is continuous, the edge of the lower end face of the operating part 700 always abuts against the reset member 400 during the rotation of the operating body 200, that is, there is always a contact between the operating body 200 and the reset member 400. When the operating body 200 inclines, the operating body 200 presses against the reset member 400 downwards, the reset member 400 has an elastic deformation and stores energy. When the external force is unloaded from the operating body 200, the reset member 400 releases the elastic potential energy, propelling the operating body 200 to restore to a balanced state, realizing the reset of the operating body 200. When the operating body 200 inclines, then it is in an inclination position, and applies an unsymmetric pressure to the reset member 400. That is, the reset member 400 suffers an unsymmetric pressure, and the reset member 400 deflects. In the present embodiment, the first pressing part 500 is disposed on the rocker arm member 300, the first pressing part 500 may be disposed on an end face of the rocker arm member 300 towards the reset member 400. When the reset member 400 suffers an unsymmetric pressure and deflects, the edge of the upper end face of the reset member 400 may abut against the first pressing part 500 as a pivot. In the present embodiment, four first pressing parts 500 in total surrounding the reset member 400 are disposed on the rocker arm member 300. The first pressing part 500 is a supporting surface that extends along a peripheral surface of the reset member 400. In this way, when the operating body 200 rotates, the upper end face of the reset member 400 will always be in touch with the edge of the lower end face of the operating part 700, and the edge of the upper end face of the reset member 400 abuts against each of the first pressing parts 500 circularly. That is, the reset member 400 always touches the operating body 200 and the first pressing parts 500 during the rotating process, the throbbing of the reset member 400 is eliminated, thereby improving the operating feeling of the multidirectional input device.

Further, a lower surface of the first pressing part 500 is an arc-shaped surface or a plane surface, the lower surface extends along a circumference of the upper end face of the reset member 400. In order to further improve the operating feeling, the lower surface of the first pressing part 500 may be designed into an arc-shaped surface or a plane surface, and the lower surface extends along the circumference of the upper end face of the reset member 400 and towards the neighboring first pressing parts 500 on the two sides of the lower surface. By this design, the contact between the reset member 400 and the first pressing part 500 is a rolling contact during the deflecting process of the reset member 400, which prevents the relatively sliding between the reset member 400 and the first pressing part 500, and helps to reduce the friction when operating, thereby improving the operating feeling. In the present embodiment, the lower surface is an arc-shaped surface, in this way, the reset member 400 can switch between two neighboring first pressing parts 500 more fluently by adjusting the radian of the arc-shaped surface, operating feeling and user experience are improved thereby.

Further, the multidirectional input device includes a second pressing part 600, the second pressing part 600 is provided on the side wall of the chamber, and extends in a direction close to the reset member 400.

At least one of the first pressing part 500 and the second pressing part 600 abuts against a side surface of the reset member 400 that faces towards the opening during the movement process of the operating body 200.

The rocker arm member 300 includes an upper rocker arm 310 and a lower rocker arm 320 orthogonal to the upper rocker arm 310. The second pressing part 600 is disposed on two opposite ends of the upper rocker arm 310 and two opposite ends of the lower rocker arm 320, the first pressing part 500 is disposed between two neighboring second pressing parts 600.

Figure 6:
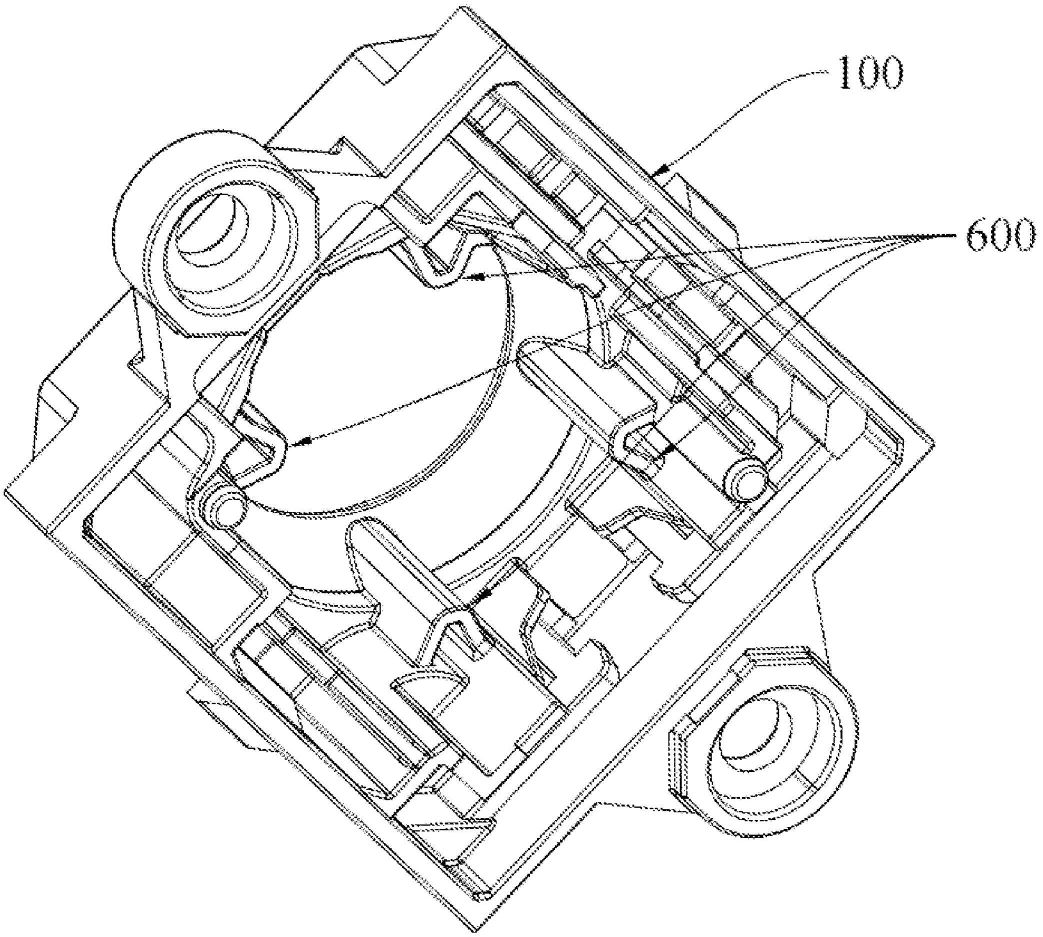
FIG. 6 is a schematic structural view of a housing of a multidirectional input device according to an embodiment of the present application.

As shown in FIG. 6, in order to further improve the operating feeling, the second pressing part 600 is provided to the multidirectional input device. The second pressing part 600 is disposed on the inner wall of the chamber of the housing 100, the second pressing part 600 may be a single independent part or a whole structure integrated to the housing 100, there is no limitation in specific here. The second pressing part 600 extends towards the reset member 400. In this way, when the operating body 200 inclines, the reset member 400 deflects, at least one of the first pressing part 500 and the second pressing part 600 abuts against the end face of the reset member 400 that faces towards the opening to support reset member 400. When the operating body 200 rotates, the reset member 400 moves synchronously, the first pressing part 500 and the second pressing part 600 abut against the reset member 400 circularly. In the present embodiment, the second pressing part 600 is provided in the housing 100. In other words, the supporting position of the reset member 400 during the deflecting process is added, and the distance between two neighboring supporting positions is shortened, the fluency of the reset member 400 switching between the supporting positions is improved thereby, the operating feeling is further improved.

Figure 4:
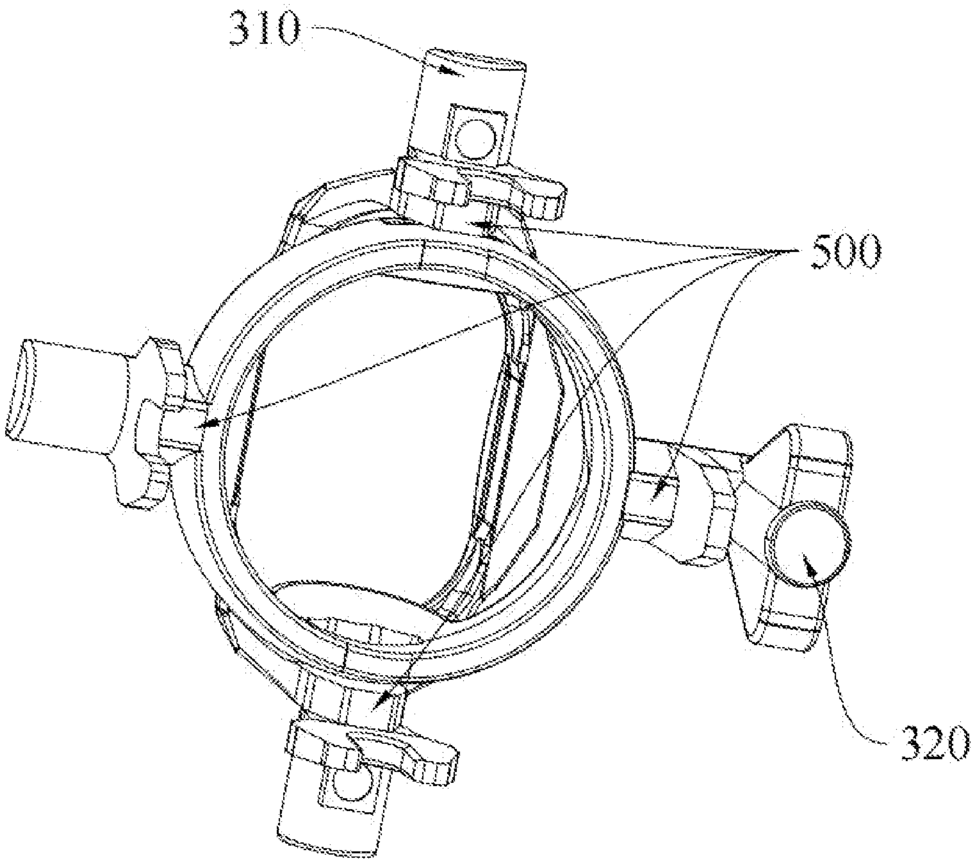
FIG. 4 is a schematic structural view of a rocker arm member of a multidirectional input device according to an embodiment of the present application.
Figure 5:
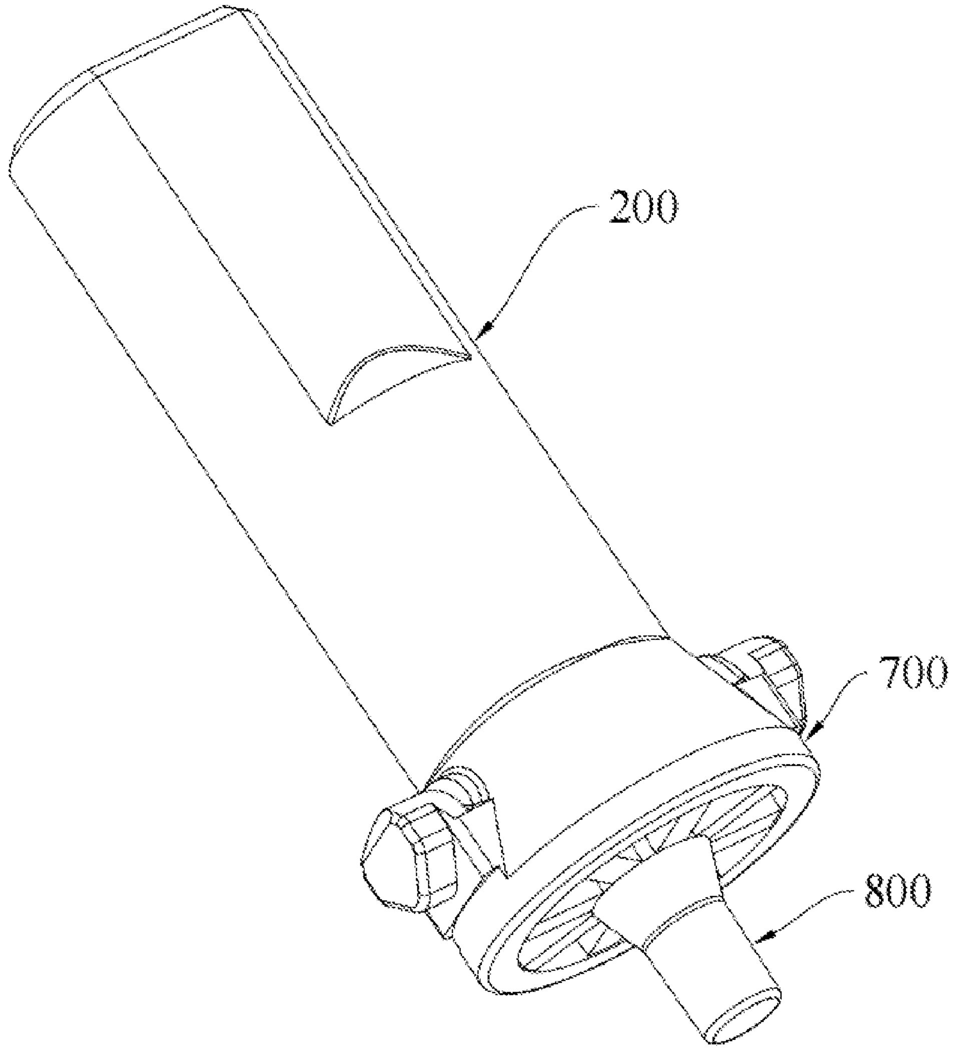
FIG. 5 is a schematic structural view of an operating body of a multidirectional input device according to an embodiment of the present application.

As shown in FIG. 4 and FIG. 6, in the present embodiment, the rocker arm member 300 may be the combination of the upper rocker arm 310 and the lower rocker arm 320. The upper rocker arm 310 and the lower rocker arm 320 are orthogonally disposed with each other and are rotatably connected to the housing 100. The first pressing part 500 may be disposed on two ends of the upper rocker arm 310 and two ends of the lower rocker arm 320. This is to say, the first pressing part 500 forms four supporting positions on the rocker arm member 300, the second pressing part 600 may be disposed between two neighboring first pressing parts 500. This is to say that the second pressing part 600 also forms four supporting positions. Eight touching positions in total are formed on the housing 100 and the rocker arm member 300, the touching positions are disposed surrounding the reset member 400, the reset member 400 switches from these touching positions when rotates. By setting like this, the distance between two neighboring pressing parts is shortened. Besides, by adjusting the relative height difference between each of neighboring pressing parts according to the structure and the shape of the reset member 400, the fluency of the reset member 400 switching between each of the pressing parts can be improved, and then the operating feeling is further improved.

Further, there is an arc transition connecting a bottom surface and a peripheral surface of the operating part 700. As shown in FIG. 6, the arc transition is formed between the bottom surface of the operating part and the peripheral surface of the operating part. In this way, the stress concentration at the edge of the operating part 700 will be greatly reduced, which helps to improve the service life. Besides, the size of the arc transition can be designed according to the track of the inclination of the operating body 200, which changes the sliding between the operating body 200 and the reset member 400 into rolling, helps to reduce the abrasion.

Further, a stopping part 800 is provided on the operating body 200. The stopping part 800 is disposed on a side surface of the operating part 700 away from the opening, and the stopping part 800 extends in a direction away from the operating part 700. Specifically, as shown in FIG. 6, the stopping part 800 is disposed on the side surface of the operating body 200 that faces towards the bottom wall of the chamber, and extends downwards. Thus, when pressing the operating body 200, the stopping part 800 can restrict the pressing stroke of the operating body 200 effectively, prevent the failure of the reset member 400 caused by an excessive pressing stroke. Besides, a pressing switch may be provided on the bottom wall of the chamber. By pressing the operating body 200, the operation to the pressing switch by the stopping part 800 can be realized, the functional diversity of the multidirectional input device can be increased.

Further, the reset member 400 includes a spring 420 and a pressing plate 410. The spring 420 is provided in the chamber, and extends in a direction close to the opening. The pressing plate 410 is provided on an end of the spring 420 towards the opening, the spring 420 presses the pressing plate 410 against the operating body 200. During the movement process of the operating body 200, the first pressing part 500 abuts against a side surface of the pressing plate 410 towards the opening.

Figure 3:
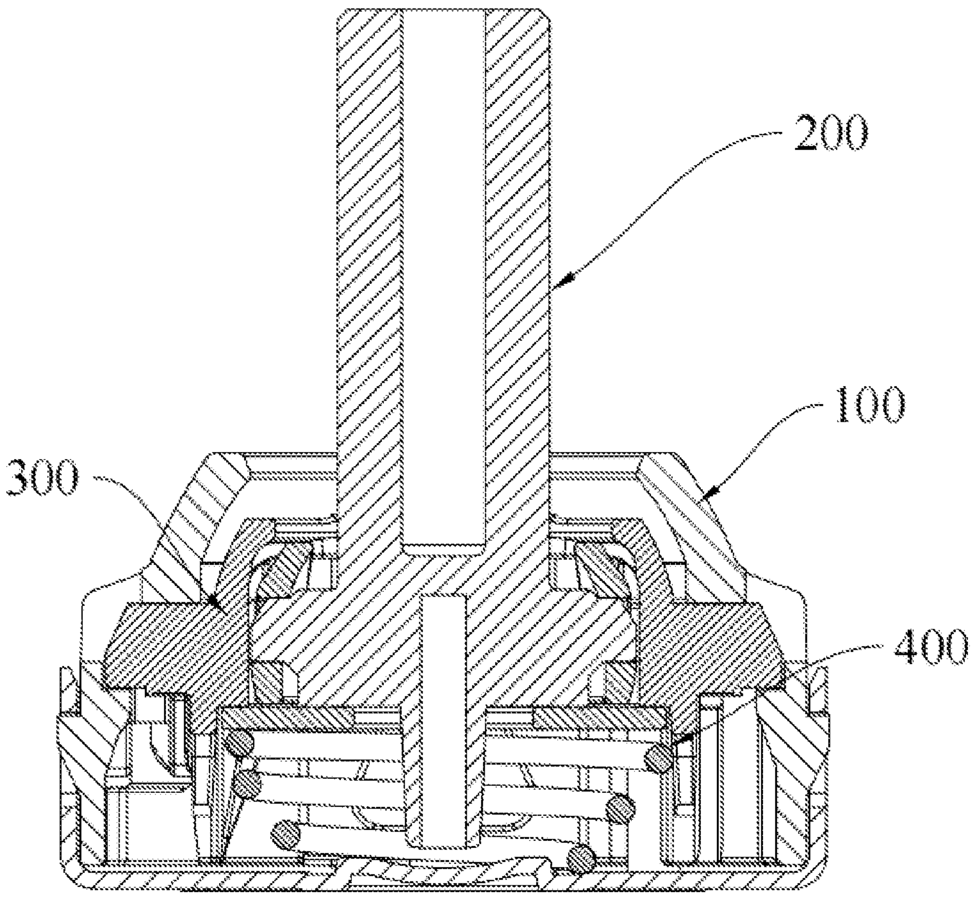
FIG. 3 is a cross-sectional view of a multidirectional input device according to an embodiment of the present application.
Figure 7:
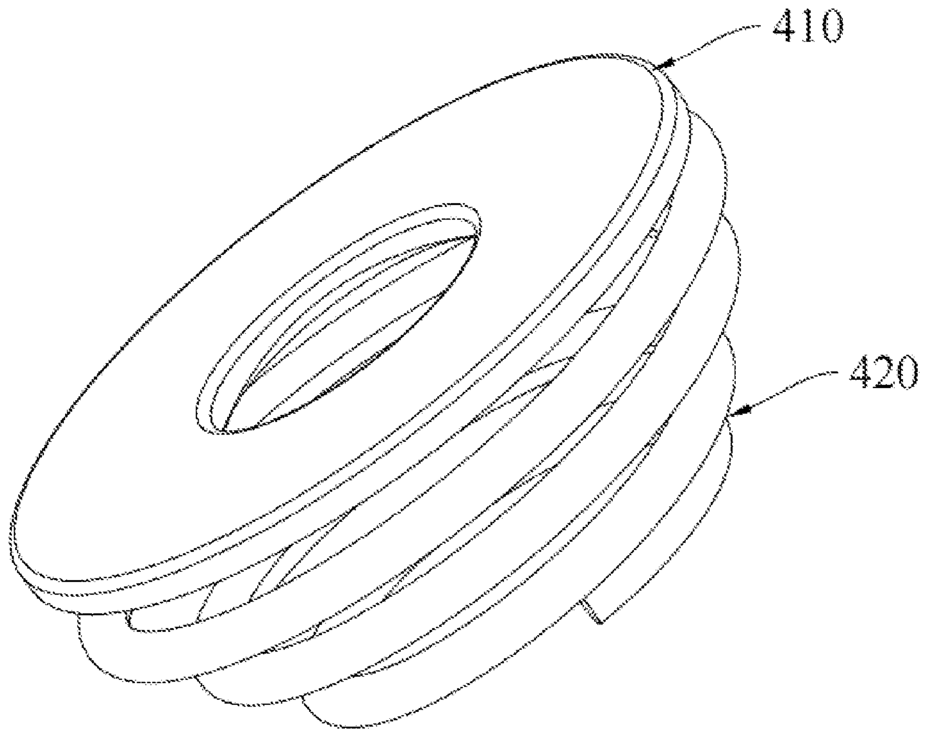
FIG. 7 is a schematic structural view of a reset member of a multidirectional input device according to an embodiment of the present application.

As shown in FIG. 3 and FIG. 7, the reset member 400 includes a pressing plate 410 and a spring 420. The spring 420 is disposed on the bottom wall of the chamber, and extends towards the opening. The pressing plate 410 is disposed on the upper end face of the spring 420, the pressing plate 410 is pressed against the operating body 200 by the elasticity of the spring 420. During the rotating process of the operating body 200, the lower end face of the operating body 200 abuts against the upper end face of the pressing plate 410, the pressing plate 410 suffers an unsymmetrical pressure from the operating body 200 and inclines, then the spring 420 compresses downwards. The edge of the pressing plate 410, which is relative to the position of the operating body 200 that suffers the unsymmetrical pressure, will abut against the first pressing part 500. When the external force is unloaded, the deformation of the spring 420 is eliminated, the spring 420 propels the pressing plate 410 to adjust the operating part 700 to a balanced state. The resultant force of each of the force brought by the spring 420 to the pressing plate 410 points straight upwards, the operating body 200 is kept at this position thereby. In order to improve the operating feeling, the pressing plate 410 may be set as a round structure part. In this way, when the pressing plate 410 swings, the distance between the supporting position of the edge of the pressing plate 410 and the position of the operating body 200 that suffers an unsymmetrical pressure is constant, and the constancy of the compression amount of the spring 420 is ensured, the consistency of the elastic force of the spring 420 is ensured while operating, thereby the operating feeling is improved.

Further, a rib is provided on a lower end face of the pressing plate 410, the rib extends along a circumference of the lower end face of the pressing plate 410 to restrict the spring 420 to an inner side of the rib. In order to improve the stability of the movement of the reset member 400, a rib may be disposed on the lower end face of the pressing plate 410. The rib may be disposed on the edge of the lower end face of the pressing plate 410 and may extend along the circumference of the pressing plate 410. The upper end face of the spring 420 abuts against the inner side of the rib. By setting the rib, the restriction for the lateral displacement of the spring 420 is realized, thus preventing a happening of the relative displacement between the pressing plate 410 and the spring 420 when the reset member 400 moves, thereby the stability of the movement of the reset member 400 is ensured.

Further, the spring 420 is a conical spring, an outer diameter of the spring 420 increases gradually from a bottom wall of the chamber to the pressing plate 410. Compared to an ordinary spring, the height of the conical spring is reduced when the spring compresses in the precondition of the same performance, which helps to reduce the overall height of the multidirectional input device. Besides, since the conical spring can provide more lateral stability, so it has less bending tendency when deflects, thus the relative horizontal of the upper end face of the spring 420 is ensured, which helps to improve the operating feeling.

The present application further provides a controller. The controller includes a main frame and the multidirectional input device, the multidirectional input device may be provided on the main frame for signal input, the specific structure of the multidirectional input device refers to the embodiments above. Since all the technical solutions of the embodiments above are adopted in the controller, the controller has at least all the beneficial effects brought by the technical solutions of the embodiments above, there is no need to repeat them therein.

The above-mentioned embodiments are only some embodiments of the present application, and are not intended to limit the scope of the present application. Any equivalent structure conversion made with reference to the description and the accompanying drawings of the present application, directly or indirectly applied in other related technical fields, should all fall in the scope of the present application.

What is claimed is:

1. A multidirectional input device, comprising:

a housing, wherein a chamber is provided inside the housing, and the housing is provided with an opening communicating with the chamber;

an operating body rotatably mounted in the chamber for an inclination operation, wherein an end of the operating body extends out of the chamber from the opening, an operating part is provided at a lower end of the operating body, and a lower end face of the operating part is circular;

a rocker arm member provided in the chamber, wherein the operating body is drivingly connected to the rocker arm member, to make the rocker arm member rotate following the inclination operation of the operating body;

a reset member provided in the chamber, wherein the reset member is elastically connected to the operating body, and an upper end face of the reset member towards the opening abuts against the lower end face of the operating part to support the reset member;

a first pressing part provided on the rocker arm member and extending towards the reset member, and a plurality of second pressing parts provided on a side wall of the chamber and extending towards the reset member, wherein during a movement process of the operating body, the lower end face of the operating part abuts against the upper end face of the reset member, and the first pressing part abuts against an edge of the upper end face of the reset member;

a lower surface of the first pressing part is an arc-shaped surface or a plane surface, and the lower surface extends along a circumference of the upper end face of the reset member;

during the movement process of the operating body, at least one of the first pressing part and the second pressing part abuts against a side surface of the reset member towards the opening; and the rocker arm member comprises an upper rocker arm and a lower rocker arm orthogonal to the upper rocker arm, the plurality of second pressing parts are provided at two opposite ends of the upper rocker arm and two opposite ends of the lower rocker arm, and the first pressing part is provided between two neighboring second pressing parts.

2. The multidirectional input device according to claim 1, wherein an arc transition is formed between a bottom surface of the operating part and a peripheral surface of the operating part.

3. The multidirectional input device according to claim 1, wherein a stopping part is further provided on the operating body, and the stopping part is provided on a side of the operating part away from the opening, and extends in a direction away from the operating part.

4. The multidirectional input device according to claim 1, wherein the reset member comprises:

a spring provided in the chamber and extending towards the opening; and a pressing plate provided at an end of the spring towards the opening, wherein the spring is configured to press the pressing plate against the operating body, during the movement process of the operating body, the first pressing part abuts against a side of the pressing plate towards the opening.

5. The multidirectional input device according to claim 4, wherein a rib is provided at a lower end face of the pressing plate, and the rib is provided along a circumference of the lower end face of the pressing plate to restrict the spring to an inner side of the rib.

6. The multidirectional input device according to claim 4, wherein the spring is a conical spring, and an outer diameter of the spring increases gradually from a bottom wall of the chamber to the pressing plate.

* * * * *